(12) United States Patent
Sultan

(10) Patent No.: US 10,108,921 B2
(45) Date of Patent: Oct. 23, 2018

(54) CUSTOMS INSPECTION AND DATA PROCESSING SYSTEM AND METHOD THEREOF FOR WEB-BASED PROCESSING OF CUSTOMS INFORMATION

(75) Inventor: Tarek Sultan, Kuwait (KW)

(73) Assignee: PUBLIC WAREHOUSING COMPANY KSC, Safat (KW)

( * ) Notice: Subject to any disclaimer, the term of this patent is extended or adjusted under 35 U.S.C. 154(b) by 485 days.

(21) Appl. No.: 12/240,817

(22) Filed: Sep. 29, 2008

(65) Prior Publication Data

US 2009/0089125 A1  Apr. 2, 2009

Related U.S. Application Data

(63) Continuation of application No. 10/505,509, filed as application No. PCT/US03/05711 on Feb. 25, 2003, now abandoned.

(Continued)

(51) Int. Cl.
 *G06Q 99/00* (2006.01)
 *G06Q 10/08* (2012.01)
 (Continued)

(52) U.S. Cl.
 CPC ......... *G06Q 10/08* (2013.01); *G06Q 10/0831* (2013.01); *G06Q 40/02* (2013.01);
 (Continued)

(58) Field of Classification Search
 USPC .......................................... 703/1; 705/30, 31
 See application file for complete search history.

(56) References Cited

U.S. PATENT DOCUMENTS 5,987,429 A   11/1999  Maritzen et al.
6,460,020 B1  10/2002  Pool et al.
(Continued)

FOREIGN PATENT DOCUMENTS

WO  WO 03073228 A3  9/2003

OTHER PUBLICATIONS

International Search Report from Application No. PCT/US03/05711 dated Aug. 21, 2003.

(Continued)

*Primary Examiner* — Talia F Crawley
(74) *Attorney, Agent, or Firm* — Millen, White, Zelano & Branigan, P.C.; William Nixon

(57) ABSTRACT

A multi-user, multi-organization web-based system for processing customs information is provided. The system includes a server device connected to a communication network and having a communication server module for communicating over the network. The server device receives a declaration pertaining to a consignment, including identification of specific goods in the consignment and predetermined parameters of the consignment. The server device further includes an application program module that verifies the declaration, conducts a risk analysis of the received information, calculates an amount of customs duty and taxes for the consignment, and determines whether or not to initiate an inspection process based on the risk analysis. A computer-implemented method for processing the customs information is also provided. The method includes the steps of receiving a declaration pertaining to a consignment, and verifying the declaration. Also included are the steps of conducting a risk analysis of the received information, calculating an amount of customs duty and taxes for the consignment, and determining whether or not to initiate an inspection process based on the risk analysis.

70 Claims, 8 Drawing Sheets

Related U.S. Application Data

(60) Provisional application No. 60/358,695, filed on Feb. 25, 2002.

(51) Int. Cl.
  *G06Q 40/02* (2012.01)
  *G06Q 40/00* (2012.01)

(52) U.S. Cl.
  CPC ............ *G06Q 40/12* (2013.12); *G06Q 40/123* (2013.12); *G06Q 99/00* (2013.01)

(56) References Cited

U.S. PATENT DOCUMENTS

| | | | |
|---|---|---|---|
| 6,707,879 B2 * | 3/2004 | McClelland | B64F 1/368 |
| | | | 378/57 |
| 7,369,970 B2 * | 5/2008 | Shimizu | G06Q 10/0875 |
| | | | 700/97 |
| 2001/0051876 A1 * | 12/2001 | Seigel | G06F 17/3087 |
| | | | 705/26.1 |
| 2002/0069095 A1 * | 6/2002 | Nishio | G06Q 10/08 |
| | | | 705/331 |
| 2002/0091574 A1 | 7/2002 | Lefebvre et al. | |
| 2002/0095355 A1 * | 7/2002 | Walker | G06Q 30/06 |
| | | | 705/80 |
| 2002/0116273 A1 | 8/2002 | Sundel | |
| 2002/0120533 A1 | 8/2002 | Wiesenmaier | |
| 2002/0120561 A1 * | 8/2002 | Chin | G06Q 10/02 |
| | | | 705/38 |
| 2003/0023522 A1 * | 1/2003 | Dutta | G06Q 10/10 |
| | | | 705/31 |
| 2003/0069738 A1 | 4/2003 | Casey et al. | |
| 2004/0102991 A1 * | 5/2004 | Casey | G06Q 10/0831 |
| | | | 705/331 |
| 2005/0114219 A1 * | 5/2005 | Sultan | G06Q 10/083 |
| | | | 705/20 |

OTHER PUBLICATIONS

International Preliminary Examination Report from Application No. PCT/US03/05711 dated Nov. 18, 2003.

Position Classification Standard for Custom Inspection Series, GS-1890, Apr. 1973, U.S. Office of Personal Management.

* cited by examiner

CUSTOMS INSPECTION AND DATA PROCESSING SYSTEM AND METHOD THEREOF FOR WEB-BASED PROCESSING OF CUSTOMS INFORMATION

CROSS-REFERENCE OF RELATED APPLICATION

This application claims the benefit under 35 U.S.C. § 119(e) of the filing date of provisional patent application Ser. No. 60/358,695 filed Feb. 25, 2002, which is incorporated herein by reference.

BACKGROUND OF THE INVENTION

1. Field of the Invention

The present invention relates generally to customs inspection and data processing systems and, more particularly, to a system, method and computer program product for processing (e.g., viewing, pricing, storing, retrieving, editing, summarizing, analyzing, reporting) customs information over the Internet from any remote location at any time.

2. Description of the Background Art

There has always been a strong demand for timely, consistent and reliable customs information in order to, for example, accurately levy customs duties and taxes on imported goods, from any remote location. Recently, the demand has been growing.

Several countries of exports have numerous points of entries and remote customs offices. Customs officials at remote customs offices have in the past attempted to verify a declared price of a consignment against previous consignments of identical or similar goods from the same country of export that are made at or about the same time as the new consignment. Very often, however, consignments cannot be found in the customs local database. The customs officials would therefore have to locate prices, which is time consuming and can create unacceptable delays in customs clearance. Even when previous consignments are found, it is usually necessary to update the price of the previous consignment in the local database based on the commercial level and quantity of the new consignment, thereby creating substantial data inconsistencies in available customs information that may be critical to a customs official in the decision making process.

Customs offices generally use communication mediums, such as dedicated satellite links, lease lines, etc., and support alternatives to communicate with other or multiple remote customs offices and the trading community. These communication mediums are very expensive, and burdensome to operate and maintain. For example, when a customs office experiences problems with its system, onsite technical support is almost, always required. For larger countries and large user-communities (e.g., United States of America, Russia, etc.), such technical support is more expensive than the services.

Lastly, current customs information processing systems lack the necessary integration of those aspects of a customs-based enterprise to provide current and reliable customs information, when and as needed, to enable a customs official or office to control its overall operation.

These features are desirable and are not implemented or available in conventional customs information processing systems.

Therefore, notwithstanding the available customs information processing systems, there remains a need in the art for a customs inspection and data processing system for reliably processing customs information over the Internet from any remote location at any time.

SUMMARY OF THE INVENTION

A primary object of the present invention is to overcome the deficiencies of the prior art systems described above by providing a customs inspection and data processing system for processing (e.g., viewing, pricing, storing, retrieving, editing, summarizing, analyzing, reporting) customs information over the Internet from any remote location at any time.

It is another object of the present invention to provide a customs inspection and data processing system that is a strong and stable foundation for security and scalability.

It is yet another object of the present invention to provide a customs inspection and data processing system that can be designed to adapt to new developments.

Yet another object of the present invention is to provide a customs inspection and data processing system that is a rich and extensible foundation for building sophisticated customs clearance applications that integrate with existing back-end systems.

Another object of the present invention is to provide a customs inspection and data processing system that allows users to have real-time analytics, and control and risk management.

The present invention achieves these objects and others by providing a web-based system for processing customs information comprising a server device connected to a communication network and having a communication server module for communicating over the network. The server device receives a declaration pertaining to a consignment, including identification of specific goods in the consignment and predetermined parameters of the consignment. The server device further includes an application program module that verifies the declaration, conducts a risk analysis of the received information, calculates an amount of customs duty and taxes for the consignment, and determines whether or not to initiate an inspection process based on the risk analysis.

The present invention further achieves these objects and others by providing a web-based system for processing customs information comprising a server device connected to a communication network and having a communication server module for communicating over the network, and a client-user device including a client application module for communicating over the network with the server device and submitting a declaration pertaining to a consignment, including identification of specific goods in the consignment, and predetermined parameters of the consignment. The server device receives a declaration, and an application program module verifies the declaration, conducts a risk analysis of the received information, calculates an amount of customs duty and taxes for the consignment, and determines whether or not to initiate an inspection process based on the risk analysis. The server device accepts the calculated amount of the customs duty and taxes from the client-user device.

Further, the present invention achieves these objects and others by providing a computer-implemented method for processing customs information, comprising the steps of receiving a declaration pertaining to a consignment, and verifying the declaration. Also included are the steps of conducting a risk analysis of the received information, calculating an amount of customs duty and taxes for the consignment, and determining whether or not to initiate an inspection process based on the risk analysis.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
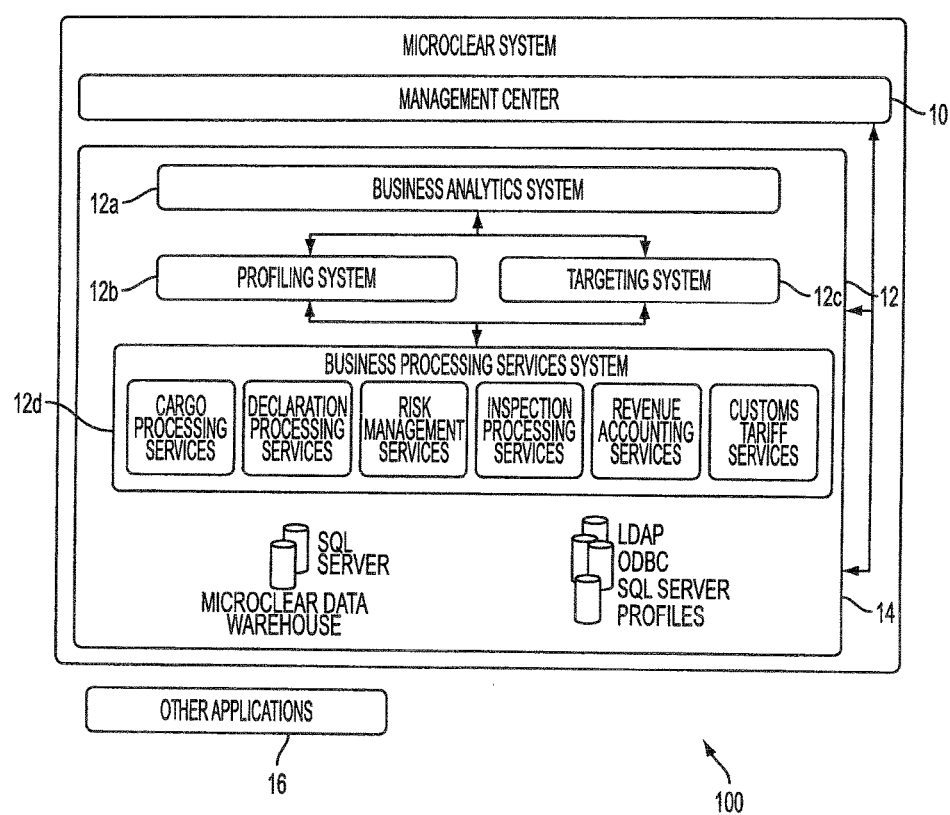
FIG. 1 is a functional block diagram of the application architecture for a customs inspection and data processing system according to the present invention.

In the following description, for purposes of explanation and not limitation, specific details are set forth, such as particular networks, communication systems, computers, terminals, devices, components, techniques, data and network protocols, software products and systems, enterprise applications, operating systems, enterprise technologies, middleware, development interfaces, hardware, etc. in order to provide a thorough understanding of the present invention. However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, enterprise applications, operating systems, enterprise technologies, middleware, development interfaces, and hardware are omitted so as not to obscure the description of the present invention.

To facilitate a complete understanding of the present invention, the description of the preferred embodiment is arranged within the following sections:

1. GLOSSARY OF TERMS
2. APPLICATION ARCHITECTURE
3. SYSTEM ARCHITECTURE AND COMPONENTS
4. OPERATION OF SYSTEM AND MODULES
5. CONCLUSION

1. Glossary of Terms

The following terms are used throughout the detailed description:

Hyperlink. A navigational link from one document to another, or from one portion (or component) of a document to another. Typically, a hyperlink is displayed as a highlighted word or phrase that can be selected by clicking on it using a mouse to jump to the associated document or documented portion.

Internet. A collection of interconnected (public and/or private) networks that are linked together by a set of standard protocols (such as TCP/IP and HTTP) to form a global, distributed network. As will be appreciated by those skilled in the art, the internet may be an intranet, public network, private network, and the like. While this term is intended to refer to what is now commonly known as the internet, it is also intended to encompass variations which may be made in the future, including changes and additions to existing standard protocols.

World Wide Web ("Web"). Used herein to refer generally to both (i) a distributed collection of interlinked, user-viewable hypertext documents (commonly referred to as Web documents or Web pages) that are accessible via the internet, and (ii) the client and server software components which provide user access to such documents using standardized internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular internet domain name, and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

URL (Uniform Resource Locator). A unique address which fully specifies the location of a file or other resource on the internet. The general format of a URL is protocol:// machineaddress:port/path/filename. The port specification is optional, and if none is entered by the user, the browser defaults to the standard port for whatever service is specified as the protocol.

The terms "user," "official," "inspector," and "office," are all used interchangeably. However, while the terms are used interchangeably, with respect to access of data and system functions, some customs officials or offices may have different privileges such that, for example, the customs information from one customs office is not accessible by any other customs office. Further, each customs office can set privileges for its "users" with regard to their ability to enter, access, edit, and/or view data.

2. Application Architecture

The customs inspection and data processing system according to the present invention provides a rich and extensible foundation for building sophisticated customs clearance applications that integrate with existing back-end systems. The architecture is based on the Microsoft .NET Framework. Accordingly, it is easy to extend the platform by choosing from a large number of available integrated third-party solutions or having developers customize tools to meet specific business needs. In either case, the present invention is designed for building tailored, scalable customs clearance solutions that optimizes the user experience, and provides business managers with real-time analytics and control of their on-line businesses.

FIG. 1 illustrates a functional block diagram of the application architecture for a customs inspection and data processing system according to the present invention. The application architecture 100 includes layers 10, 12 and 14. Layer 10 comprises a Management Center module that allows system administrators to configure system resources and manage applications, databases and Web servers.

Layer 12 comprises four main modules or sub-systems: a Business Analytics System 12a, a Profiling System 12b, a Targeting System 12c, and a Business Processing Services System 12d. Each system is designed to be easily customized to meet specific business needs. A detailed description of the Business Analytics System 12a and Business Processing Services System 12d will now be given.

A. Business Analytics System 12a

Biz Analytics Services analyze data in the operational data store to refine the view of the customer with respect to empirical transactional, segmentation, and additional profiling data. The Services Optimizer operates upon this refined data to plan, develop, deliver, and manage the broad intelligence communications plan to make it available to Biz Services. The Services Optimizer links directly with Biz Services to execute a series of steps when needed.

The User Interaction Services are a delivery vehicle for the services, targeting, and a means for collecting interaction data. That data is fed back to the operational data store to be used by the Biz Analytics Services applications to refine the business view of the customer and to manage the ongoing operational plan and national objectives.

All collected data is sent to the Operational Data Store (ODS). The Biz Analytics Services analyzes and refines the data. The Service Optimizer together with the Biz Services process the refined data to further provide the interaction data to the user and provide the intelligence required for the system operation. This is a cyclic process where data is collected from users and then refined data is forwarded to the user per request.

B. Business Processing Services System 12d

The Business Processing Services System 12d includes Cargo Processing Services, Declaration Processing Services, Revenue Accounting Services, Risk Management Services, Inspection Processing Services, and Customs Tariff Services.

Action services are software infrastructure that defines and links one or more stages of a business process, thereby running them in logical sequence to complete a specific task. Action services divide processing into stages (e.g., abstractions that describe a category of work). They also determine the sequence in which each category of work is performed. Each stage of an action service contains one or more action service component that can be configured to work with the unique requirements of the system. For example, a typical Customs Declaration Processing action service may include a Traders Information stage, a Payment stage, and an Inspection stage.

An action service component supports a standard set of interfaces that can be invoked in a uniform fashion during the execution of an action service. Action service configuration files define action services. The action service specified by the file is created and run by an action controller object.

The action service architecture allows for new action service components (e.g., actors) to be created and "plugged into" existing action services, often replacing an existing action service component and altering the original processing being performed by that action service. A common example of this action service components replacement is the action service that is executed to calculate the customs duties, taxes and charges while the declaration is being processed for the completion of the declaration transaction.

Several action service components designed to calculate duties and taxes may be included. It will be appreciated by those skilled in the art, however, that these components merely demonstrate the duties tax stage of the payment action service, and do not necessarily perform duties and tax calculations in accordance with the specific duties and tax requirements and law. These services or use tax component software should be customized to meet the needs of a specific customs office or country.

Additional action services can be developed to meet the specific needs of a business. The architecture of the action services makes it very easy to insert additional action service components into existing action services.

Action services are used in a variety of capacities throughout the present invention to, for example, process transactions, select personalized content for display, and process direct mail jobs. Action service is a software infrastructure that executes a sequence of components. Each component is a custom-tailored .NET object designed to perform operations on some part of a service document. The action controller coordinates the interaction of the action service components (e.g., Actors) by passing the service document from one component to another.

Action services are used to model many processes and include cargo processing, which is handled by the Cargo Processing Actors; declaration processing, which is handled by the Declaration Processing Actors; revenue accounting, which is handled by the Revenue Accounting Actors; inspection processing, which is handled by the Inspection Processing Actors; customs tariff, which is handled by the Customs Tariff Actors; and declaration selection, which is handled by the Declaration Selection Framework (DSF) Actors. These action services automate manifest, declaration, revenue collection and inspection processing in the customs clearance environment.

The DSF action services automate the selection of declarations for inspection for risk management purposes. A set of components can be combined into action services to support either architecture. In addition, new components can be created to extend the capabilities of the action service architecture as explained above.

Several action service features that provide flexible customs clearance process handling, easier clearance procedure maintenance, more flexible duties, tax and exemption handling, and greater efficiency in action service loading and execution include high-precision currency handling, multiple customs clearance process handling (Customs Control Procedures), duties, Tax and Exemption handling, action service pooling, and dynamic action services.

i. Cargo Processing Services

Cargo processing services include loading journey details and house bills, verifying delivery orders and no objection certificates (NOCs). The cargo processing action services divide cargo processing into stages that describe a category of work. Thus, a typical cargo processing action services may include a Journey Information stage, a Manifest Process stage, a House Bills Creation stage, an Authorizing slot agent stage, and a Delivery Order creation.

ii. Declaration Processing Services

Declaration processing services verify the declaration document, capture invoice details, analyze risk against the target criteria payment services, and calculate the amount of customs duty and taxes.

iii. Inspection Processing Services

Inspection processing services are a collection of business intelligence that can be staged or organized to fulfill specific requirements of the inspection process. The process includes reporting the inspection of the consignment, and producing details of collecting penalties and fees for the inspection, and the goods seized.

iv. Revenue Accounting Services

Revenue Accounting services are related to the collection of revenue from various income sources, such as tax, duty, deposits, fines, penalties, or the like. The Revenue Accounting service divides revenue collection into stages that describe a category of work. Thus, a typical revenue collection service may include an Invoice Generation stage, a Payment Process stage, and a Customs Receipt generation stage. The various stages of revenue collection starts with an importer declaring his/her consignment, receiving customs invoice, and making payment and other related activities.

v. Risk Management Services

Risk Management System is a systematic application of management procedures and advanced decision support that provides customs with the necessary information to deal with consignments that pose a risk. The Risk Management System executes dynamic business rules that are evaluated for calculations, decision making support, complicated business processes evaluation and customization of dynamic business rules, etc. Risk management includes action services such as intelligent data scans, data mining, etc.

The Risk Management & Selectivity optimizer consolidates and analyzes data to derive information. The Risk Management Process involves identifying, analyzing and evaluating a risk for a submitted declaration. The decision support system improves customs and tax revenue while deterring fraud and criminal activity, in addition to control contraband and substandard goods.

vi. Customs Tariff Services

Customs Tariff services organize the tariff items, customs duties, taxation, exemptions and charges. Commodities are identified by an HS code. The Customs Tariff system helps maintain the HS codes and tariff details. HS codes are harmonized system codes (e.g., a code that is given to every item that is imported). An HS code is a combination of sections, headings, chapters and items.

vii. Administration Services

Administration services handle the system-wide services of managing user profiles, organizations profiles, groups, tariffs, etc. Administration services also include action services to define new currencies, locations, types and exchange rates to the application. It is responsible for day-to-day administration, and deals with user management, access control and other look-up functions, such as the maintenance of the HS codes, shipping agents, etc.

Layer 14 includes a SQL server (Data Warehouse), and LDAP, ODBC and SQL server (Profiles).

Referring to FIG. 1, other applications and tools 16 are included in the application architecture 100. For example, an Installation Program packages and unpacks Web sites and settings so that they are easily deployed. A Business Process Services management provides business managers with the necessary management tools to, for example, update customs tariffs and profiles, manage risks (e.g., target declarations based on goods and/or traders), and analyze customs clearance information for risk management and selectivity for inspection and revenue effectiveness.

In addition to the above, the following administration tools, as illustrated in Table 1, are provided for maintaining installation:

TABLE 1

| Task/Tool | Operation |
| --- | --- |
| SQL Enterprise Manager | Manages System's databases |
| IIS snap-in | Manages Web servers |
| Windows 2000 Active Directory Users and Computers | Manages Windows 2000 user accounts, computer accounts, and security and distribution groups |
| Windows 2000 Event Viewer | Views event logs |
| Windows 2000 System Monitor | Collects and views real-time computer performance data |
| Windows 2000 Backup Wizard | Backs up IIS metabase, Windows 2000 Registry settings, and System files |
| Windows 2000 Restore Wizard | Restores IIS metabase, Windows 2000 Registry settings, and System files |

3. System Architecture and Components

Figure 2:
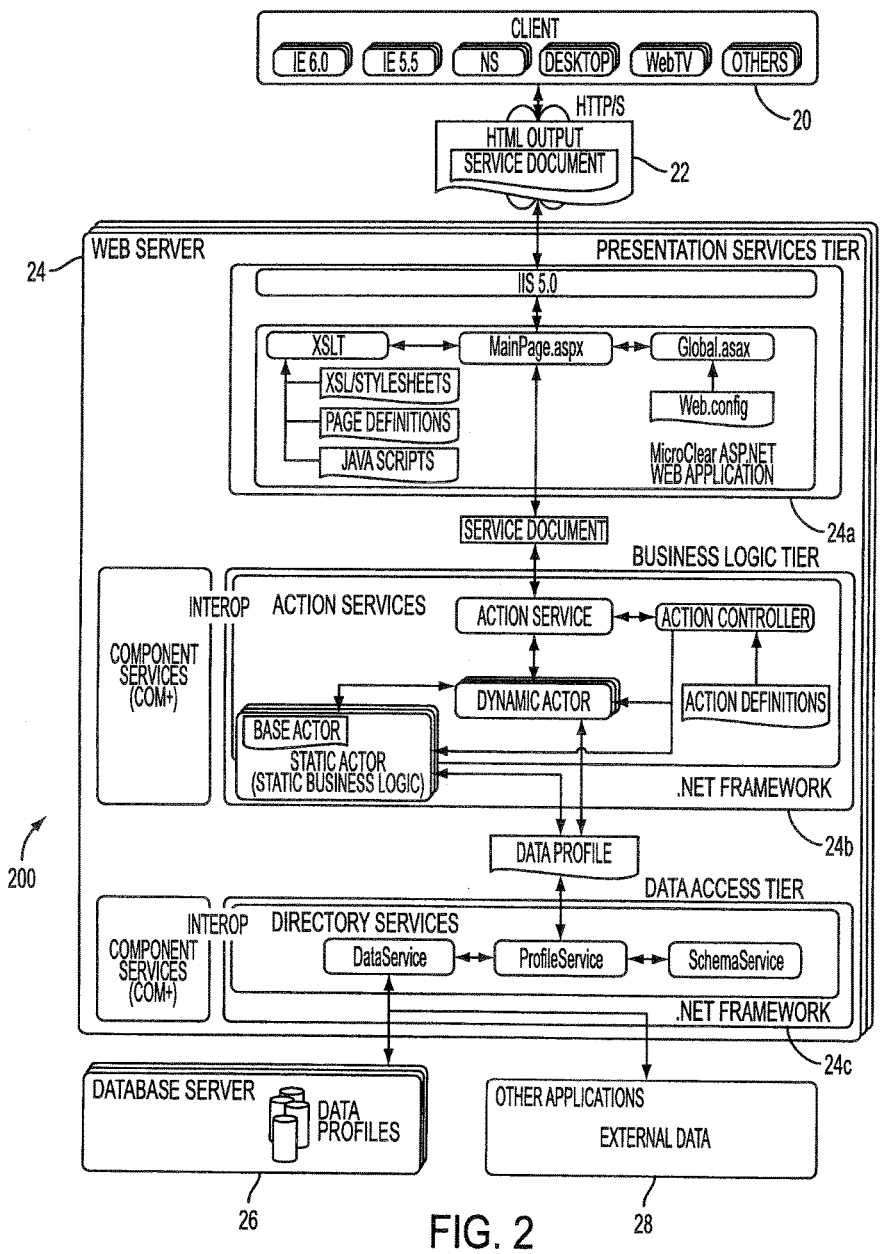
FIG. 2 is a functional block diagram of a customs inspection and data processing system according to the present invention.

FIG. 2 illustrates the logical architecture for a customs inspection and data processing system according to the present invention. The logical architecture is based on the Microsoft .NET architecture which supports many different physical configurations and highly scalable web applications. The logical architecture is a multi-tier application with host, systems and business-to-business integration. The integration supports batch and real-time connectors.

Referring to FIG. 2, the highly scalable logical architecture 200 includes a client-user device 20 and a server device 24, which are adapted to communicate over a communications network 22, such as the Internet.

The client-user device 20 may include a client application module (not shown), which may be, for example, a web browser (e.g., Microsoft's Internet Explorer). The client-user device 20 may be a desktop, WebTV, or any type of computing device that allows a user to interactively browse the Internet 22 via the web browser. The web browser may include software that runs on the client-user device 20 and displays web pages on the World Wide Web. The web browser displays information on the client-user device 20 by interpreting HTML code that is used to build web pages on the World Wide Web.

Generally, web pages display graphics, sound and multimedia files, hyperlinks, files that can be downloaded, and other internet resources. The coding in the HTML files tells the web browser how to display the text, graphics, links and multimedia files on the web pages. The HTML file that the web browser loads to display the web page does not actually contain the graphics, sound, multimedia files and other resources. Instead, it contains HTML references to those graphics and files.

In an implementation described herein, the server device 24 includes a communication server module and an application program server module. The communication server module acts as a web server and communicates with the client-user device 20 over the Internet 22. The application program server module includes software applications, such as the MicroClear ASP.net web application.

Among other things, the server device 24 hosts the user interface (XML/XSL and ASP.NET pages) and lightweight .NET objects called by the ASP.NET pages, and provides the logic that requests data from the SQL servers, which provide the data store and management. The server device 24 is maintained by a service provider that handles hardware and software upgrades, troubleshooting and maintenance. Since the service provider handles the tasks of upgrading, troubleshooting and maintenance, users need not worry about these tasks. Further, since the MicroClear application is maintained on the server device 24, users spend less time with system crashes, upgrades and installation difficulties.

In the multi-tier software hierarchy model of the server device 24, each tier provides specialized services that minimize the impact of changes to, for example, the presentation, business logic and database. A brief description of the Presentation Services Tier 24a, Business Logic Tier 24b and Data Access Tier 24c will now be given.

The Presentation Tier 24a is responsible for delivering data for each requested HTML page by marrying dynamic data generated by lower levels with static graphical templates.

The Business Logic Tier 24b contains the bulk of the processing logic of the application. The Business Logic Tier 24b is based primarily on the Microsoft .NET Framework, thereby making it easy to extend the platform by choosing from the large number of integrated third-party solutions available, or by having the developers customize tools to meet their business needs.

The Data Access Tier 24c is also based on the Microsoft .NET Framework, and acts as an interface between the Business Logic Tier 24b, and the database server 26 and other applications 28. A database server module of the database server 26 includes data structures that define how the user or organization databases are set up and how information is stored in and retrieved by the system. The Data Access Tier 24c serves two main purposes: 1) eliminates all database-specific information from being spread throughout higher-level tiers, and 2) provides translation between the domain object model and database relational model.

4. Operation of System and Modules

Figure 3:
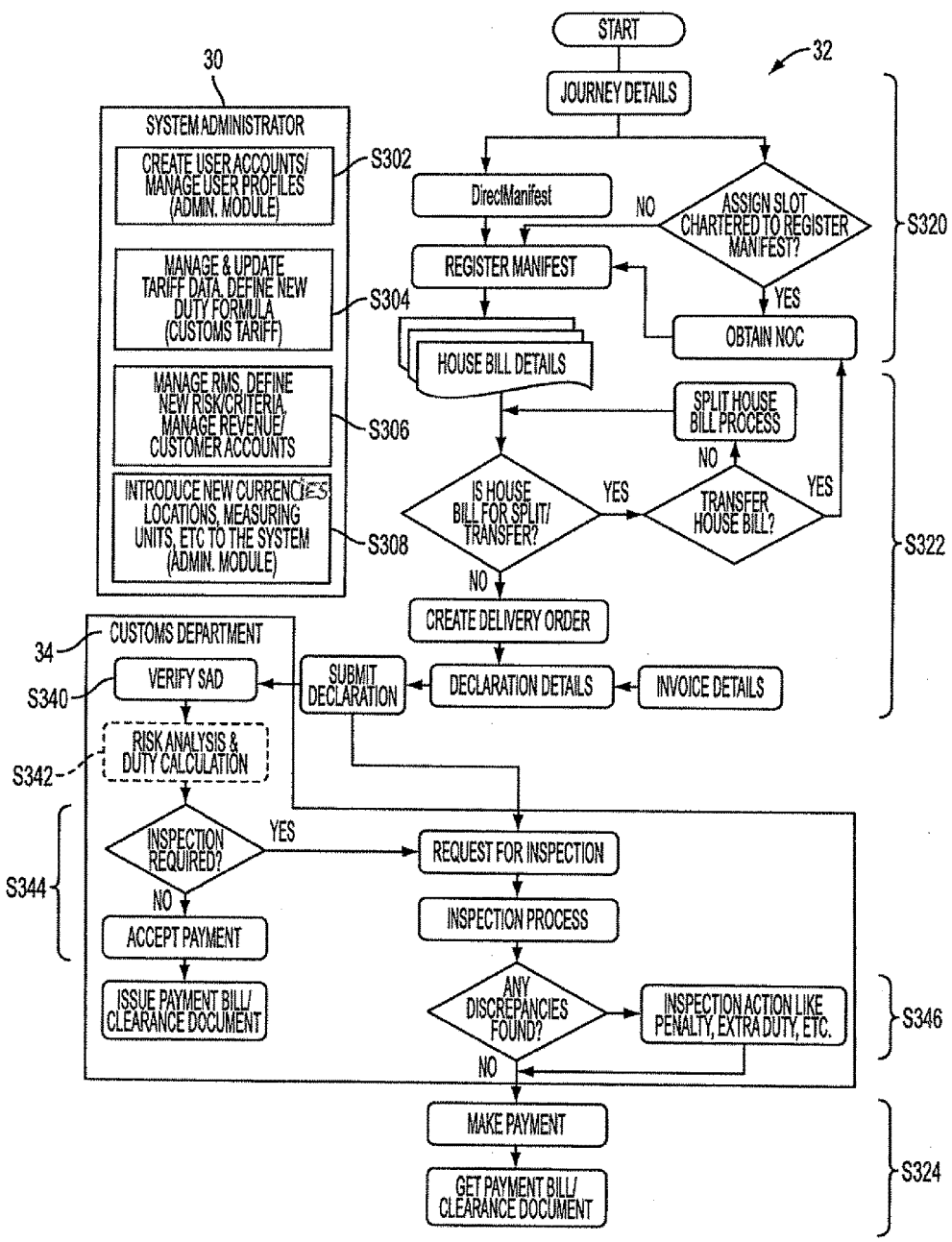
FIG. 3 is a flow diagram illustrating an embodiment of a customs inspection and data processing system according to the present invention.

FIG. 3 is a flow diagram illustrating an embodiment of a customs inspection and data processing system according to the present invention. There are different privileges and roles for each user/participant (e.g., system administrator, customs office, importer) of the customs inspection and data processing system. For example, the system administrators 30 are responsible for rebuilding the system with new functionalities (Configuration Manager); managing user profiles, organizing profiles, etc. (Security Administration/ Administration Module) in step S302; creating new duty calculation formulas or editing existing ones (Configuration Manager), and updating tariff data (Customs Tariff Module) in step S304; managing risk management, defining new risk criteria, and managing revenue/customer accounts in step S306; and defining new currencies, locations, measuring units, etc. (Biz. Administration) in step S308. In summary, among other things, system administrators define users, organizations, employees, groups, etc.; and assign roles, user IDs and passwords. Users can view and manage only those modules for which they are authorized.

If a system administrator needs to verify a declared price of a consignment, the present invention has an interface to the Customs Inspection and Audit Process Utilizing On-Line Global Pricing System (ICS), U.S. Provisional Application 60/294,248 filed May 31, 2001, which is incorporated herein by reference. A pricing request can be sent to the ICS via an external interface to the system, and the information can be retrieved online from the ICS price database.

Similarly, agents/importers 32 and customs officials 34 have different roles in the present invention. Referring to FIG. 3, an importer 32 registers his/her manifest document (Cargo Module) in step S320, and submits his customs declaration (e.g., a local customs document) (Declaration Module) to the customs department in step S322. A customs official then verifies the declaration document (Declaration Module) in step S340, and performs risk analysis and duty calculations (Risk Management Module) in step S342. If an inspection is required, an inspection process is initiated or requested (Inspection Module) in step S344. If there are no discrepancies or an inspection is not required, then payment bills are issued (Revenue Accounting Module), inspection findings are reported (Inspection Module), and revenue accounting information is updated (Revenue Accounting Module) in step S346. If there are no discrepancies, then the importer makes duty payments (Revenue Accounting Module) in step S324.

Each role above is realized using specific aspects and several task oriented modules such as the Cargo Module, Declaration Module, Risk Management Module, Inspection Module, Revenue Accounting & Selectivity Module, Tariff System and Administration Module (e.g., the Business Processing Services System 12d of FIG. 1).

Figure 4:
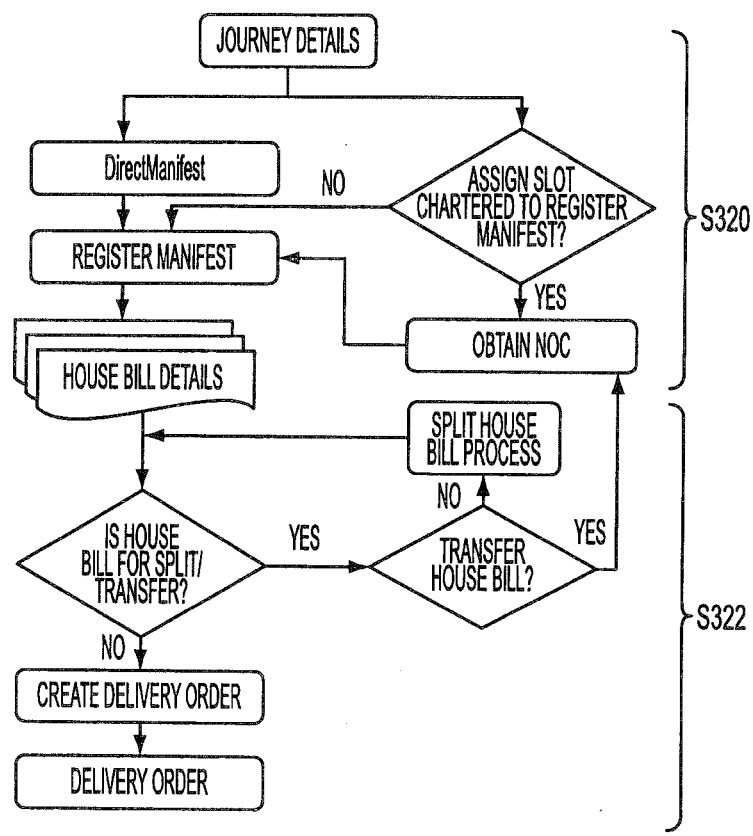
FIG. 4 is a flow diagram illustrating details of a Cargo Control Module of the customs inspection and data processing system of FIG. 3.

FIG. 4 illustrates a flow diagram of the Cargo Control Module of the customs inspection and data processing system of FIG. 3. Steps S320 through S322 of FIG. 3 are illustrated in FIG. 4, and are realized by the Cargo Control Module. The Cargo Control Module deals with the registration of arriving cargo. This assists carrier agents with keeping track of the goods and issuing delivery orders for importers. The Cargo Control Module has several action services that deal with specific areas, such as journeys (e.g., captures voyage details), manifests (e.g., manifests registration), house bills (e.g., provides goods details), delivery orders, and NOCs. The manifest registration process results in the creation of a manifest registration number (MRN). A delivery order (DO) is also created in this module.

Figure 5:
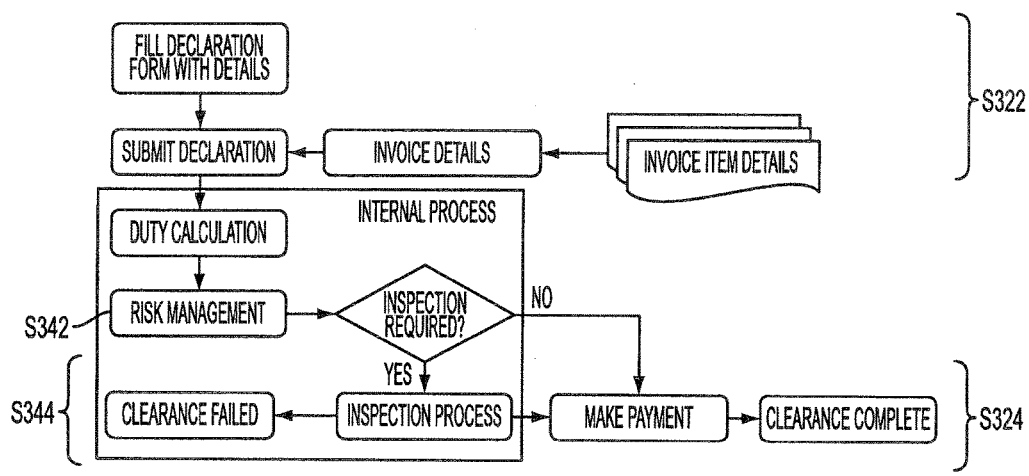
FIG. 5 is a flow diagram illustrating details of a Declaration Module of the customs inspection and data processing system of FIG. 3.

FIG. 5 is a flow diagram illustrating details of the Declaration Module of the customs inspection and data processing system of FIG. 3. Steps S322 through S324 and steps S342 through S344 of FIG. 3 are illustrated in FIG. 5, and are realized by the Declaration Module. The Declaration Module enables importers and clearing agents to request and receive necessary customs clearance for their goods.

The customs inspection and data processing system of the present invention is efficient and customer-oriented, and affords all users with many options. For example, the importer can submit his declaration in advance without invoice details before his goods arrive, and upload the invoice details later. A customs bill document can be generated, and the bill can be submitted to the customs department for clearance of the goods. Once the declaration is submitted, the Risk Management Module handles the risk matters on-line based on certain defined criteria, and decides on the status of the declaration (i.e., RED, YELLOW, GREEN channel). If a risk is found, an inspection request is sent to the Inspection Module.

A Revenue Tracking Module calculates the revenue, and any acceptable means of payment (e.g., cash, check, money order, credit card, user account maintained with the customs department, or the like) can be rendered. The customs bill is produced at the customs office for verification, and the customs office verifies the bill against the manifest for any discrepancies. If in compliance, a document is issued for the release of the goods.

The customs official can view the declaration submitted by the agent/importer along with the status of the declaration after it has undergone the risk management process. A declaration having a RED channel status denotes that the declaration has to undergo the inspection process. A YELLOW channel status denotes that the declaration is incomplete or other information is required. A GREEN channel status denotes that the declaration is satisfactory; however, an inspection can be initiated if warranted.

Figure 6:
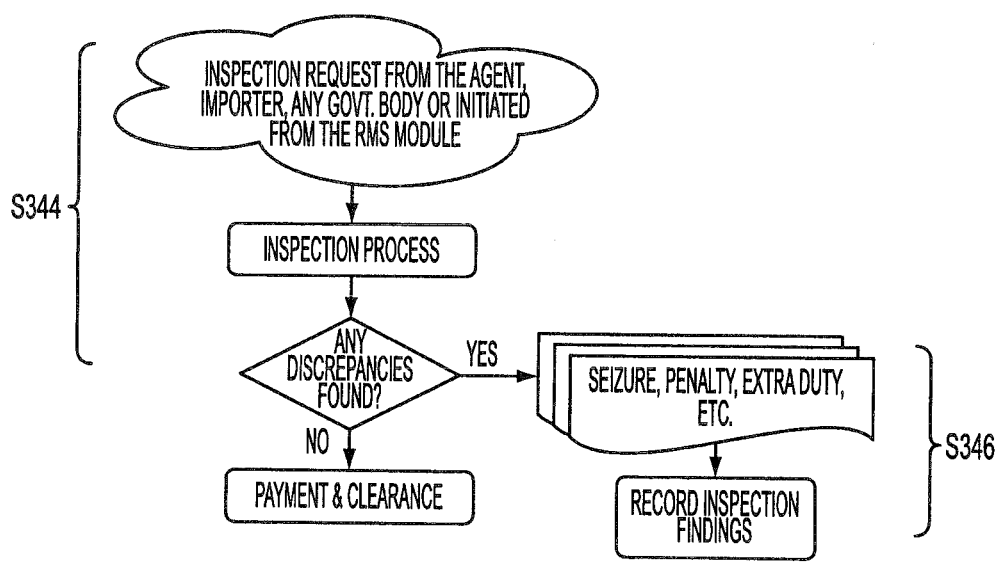
FIG. 6 is a flow diagram illustrating details of an Inspection Module of the customs inspection and data processing system of FIG. 3.

FIG. 6 is a flow diagram illustrating details of the Inspection Module of the customs inspection and data processing system of FIG. 3. Steps S344 through S346 of FIG. 3 are illustrated in FIG. 6, and are realized by the Inspection Module. The Inspection Module deals with the inspection process involved in customs clearance. The inspection process assists customs officials or inspectors with tracking and reporting inspection cases. The Inspection Module may be shared by other organizations within the same module. Once the declaration form is properly completed and submitted (in the Declaration Module), an inspection process can be initiated by the customs official at anytime.

The inspection may be conducted if there is a risk factor or upon an inspection request. The inspection process is coupled with the Risk Management & Selectivity (RMS) Module. If a risk is detected in the RMS Module, an inspection request is forwarded to the Inspection Module. Three types of inspections are provided, and include random, sample and full inspections. In a random inspection, goods are selected randomly based on the criteria defined in the risk management. In a sample inspection, a sample of the goods is inspected; and in a full inspection, the entire goods are inspected.

Figure 7:
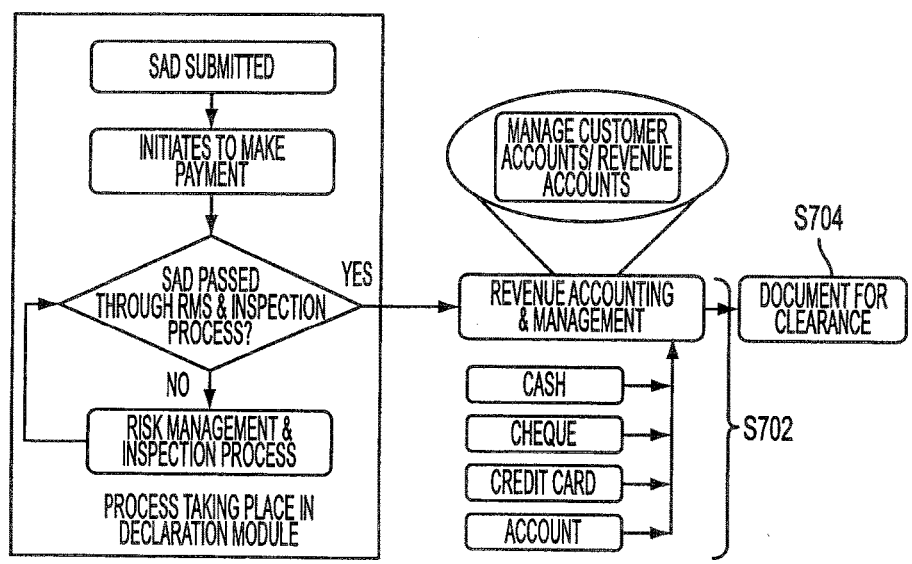
FIG. 7 is a flow diagram illustrating details of a Revenue Accounting Module of the customs inspection and data processing system of FIG. 3.

FIG. 7 is a flow diagram illustrating details of the Revenue Accounting Module of the customs inspection and data processing system of FIG. 3. The Revenue Accounting Module manages revenues generated from a variety of income sources in step S702. The system collects, tracks, reimburses and manages the revenue generated from, for example, duties, taxes, excises, fines, deposits, other charges, etc. After a declaration is submitted, the system calculates the duties, taxes and other fees based on the value of the goods and its classification. Each successful and completed transaction will have a revenue figure assigned to it (step S704). The Revenue Accounting Module keeps track of the payments throughout the life of the transaction.

Figure 8:
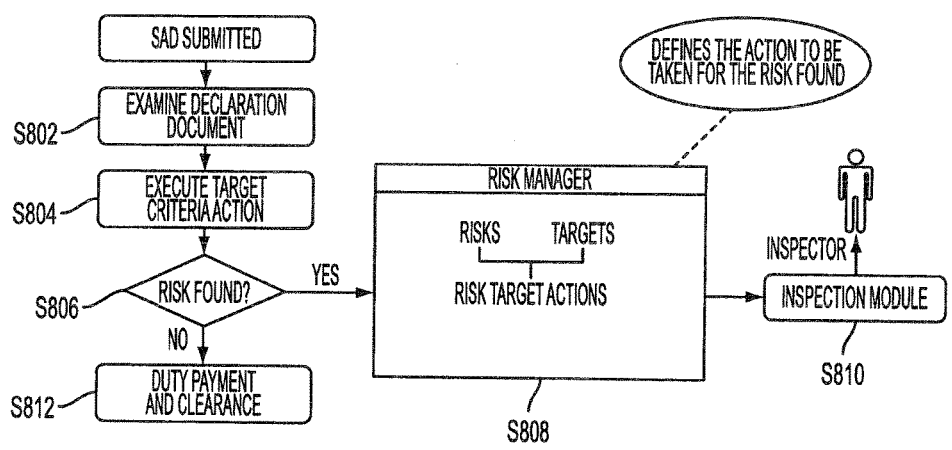
FIG. 8 is a flow diagram illustrating details of a Risk Management & Selectivity Module of the customs inspection and data processing system of FIG. 3.

FIG. 8 is a flow diagram illustrating details of the Risk Management & Selectivity (RMS) Module of the customs inspection and data processing system of FIG. 3. The RMS Module facilitates the optimization of high and low level customs processes, risks and resources. The RMS Module may be customized based on specific risk management procedures, criteria and strategies adopted by a host country. Risk management involves taking measures to continually improve the effectiveness of work performed by customs inspectors.

A customs department primary goal is to find imports that are non-compliant. In order to ensure compliance, the declaration and accompanying documentation are reviewed in step S802. The RMS Module scans through the declarations submitted for any risk, and determines the status of the declaration (e.g., RED, YELLOW or GREEN channel) in steps S804 and S806. If a risk is found, an inspection request is sent to the Inspection Module indicating the appropriate steps to be taken (steps S808 and S810). If no risk is found, duty payment is required for clearance in step S812.

The risk management process consists of four key steps: (1) define risk and target criteria, (2) analyze and assess risk, (3) prescribe risk target action, and (4) track and report. Risk management for customs is an evolutionary process, and business processes should be updated accordingly in order to accommodate the RMS Module.

The Configuration Manager allows users to promptly change the workflow of an existing system, and update their business processes according to their needs. It is an intelligent business service provider that supports and satisfies business requirements customization. New business rules and duty calculation formulas can be defined or edited using this feature. The system can be build from scratch using this tool with hardly any coding.

The features of the Configuration manager include re-building workflow transition, introducing new action service components, defining new actions or editing existing ones, and changing page designs, defining/editing duty calculation formulas.

The customs inspection and data processing system of the present invention may comprise other task oriented modules. For example, the Customs Tariff Module is a way of organizing and managing tariff items, customs duties, taxation, seasonal duties, exemptions and charges. The Tariff System defines sections, chapters, headings, items, various import duties such as customs duty (as per the rules of each country), seasonal duty, customs recording fees, special taxes on imported food and agricultural products, taxes according to the mass of the goods, excise tax, etc.

The Administration Module manages the allocation of system-wide services to authorized users. It also maintains and administers the system's reference tables, such as user profiles tables, organizations profiles tables, groups, etc. The Administration Module can define new types (e.g., Bill types, DO types, etc.), new locations and new measuring units that are used in other modules. System administrators implement security, and only authorized individuals are provided with a user account.

The Business Administration section allows new currencies, locations, measuring units, types and exchange rates into the system. Since the system supports multi-currency, exchange rates play an important role during duty payment in the Revenue Accounting Module.

In the Trade Information & Statistics Module, trade information and statistics are generated from the system operational data store (ODS) according to certain criteria of interest to customs and the international trade community. This information is composed of a variety of reports. In addition to the standard reports, the system provides the ability to create user-defined reports as well as a user-defined query functionality to meet specific requirements.

5. Conclusion

The customs inspection and data processing system of the present invention helps countries modernize, re-engineer, and energize their customs clearance and associated trade process. It aims at speeding up customs clearance through the introduction of highly secured web-based computerization and simplification of procedures, thereby minimizing administrative costs.

The customs inspection and data processing system of the present invention provides functionality to ease the process of internationalization, and supports multi-language, multiple currencies, various date formats, etc. The present invention is built on a 16-bit UNICODE compliant in order to support non-alphanumeric characters. The application architecture is flexible and easily adaptable.

The intelligent risk management system supports advanced decision making, track non-compliance, and enhance revenue collection by ensuring that (1) all goods are declared, (2) duty/tax calculations are correct, and (3) duty/exemptions, preference regimes, etc. are correctly applied and managed. The customs inspection and data processing system of the present invention can be customized to restructure and adapt to new customs operation processes easily. In addition, it aims at producing reliable and timely trade and fiscal statistics to assist in the economic planning process as a by-product of the customs clearance process.

The customs inspection and data processing system of the present invention revolutionizes the process of customs clearance for the trading and customs community. All customs processes and transactions are accessible via secured and encrypted internet access. These capabilities extend services to anyone who has access to the Internet, as no special software or hardware, other than a standard internet connection, is required to access and process customs information (e.g., perform transactions and other customer service processes). Companies are allowed to process almost all of their paperwork online, eliminating prior art systems and providing greater efficiencies and customer service.

The customs inspection and data processing system of the present invention is a comprehensive and integrated customs modernization, control, and advanced decision support system. Additionally, the present invention takes full advantage of Microsoft .NET Platform and windows 2000 Platform, including support for the Microsoft Active Directory service, .NET Enterprise Servers and .NET Platform technologies (e.g., Common Language Runtime, C# and Web Services).

The system, method and computer program product of the present invention can be implemented on any wired or wireless communication medium, including, but not limited to, satellite, cellular, wireless or hardwired WAN, LAN and the like, public communication network, such as the internet, and private communication network, such as an intranet. The design architecture of the system enables the system to easily integrate with any hardware platform, operating system, and most desktop and enterprise applications. The system is platform, network, and operating system agnostic.

The system, method and computer program product of the present invention supports a wide range of data and network protocols, including native support for IP, XML, HL7, WAP, I-mode, G3 and other industry standard data and network protocols. The client and client application modules of the system, method and computer program product of the present invention can be implemented using any operating system, and associated hardware including, but not limited to, Palm OS, Microsoft Windows CE, Unix, Linux, VMS, IBM, Microsoft Windows NT, 95, 98, 200, ME and XP, and the like.

The systems, processes and components set forth in the present description may be implemented using one or more general purpose computers, microprocessors or the like, programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed is:

1. A computer implemented web-based system for processing customs information at a customs organization, comprising:
 a client-user device connected to a communication network to generate and register an electronic declaration document from a user pertaining to a consignment using a declaration module;
 a server device connected to the communication network for processing customs information for goods clearance received at a customs organization, said server device having a communication server module for communicating over said network;
 said server device receiving the electronic declaration document pertaining to a consignment at the customs organization from the client-user device over the communication network prior to receipt of the consignment from the user at the customs organization, the electronic declaration document including identification of specific goods in said consignment and predetermined parameters of said consignment, said predetermined parameters comprising tariff, rule, or regulatory information pertaining to said consignment; and said server device including an application program module at the customs organization that, prior to receipt of the consignment at the customs organization, identifies the user corresponding to said electronic declaration document and the consignment;

verifies said electronic declaration document received at the customs organization using the declaration module, configures a risk management module based on a transaction history and at least one factor pertaining to the user;

conducts a risk analysis using the risk management module, wherein the risk management module considers the electronic declaration document and accompanying electronic documentation using risk and target criteria for the risk analysis to determine a status for said declaration document, wherein the risk analysis configures the risk management module to define the risk and target criteria, analyze and assess risk based on the risk and target criteria, prescribe risk target action according to the risk, and track and report the risk target action, wherein the status pertains to the identification of specific goods, the risk parameters and the predetermined parameters listed within said declaration document, calculates an amount of customs duty and taxes for said consignment, and determines whether to initiate an inspection process at said customs organization based on results of said status for said declaration document when the consignment is received at the customs organization.

2. The system of claim 1, wherein said inspection process is initiated based on the risk analysis results, and said application program module causes said server device to re-calculate the amount of said customs duty and taxes if there is a consignment discrepancy.

3. The system of claim 2, wherein said application program module causes said server device to record said consignment discrepancy.

4. The system of claim 1, wherein said application program module causes said server device to accept customs duty and tax payment from said user.

5. The system of claim 4, wherein said server device issues a clearance document after said user pays said customs duty and taxes for said consignment.

6. The system of claim 1, wherein said inspection process is initiated, said application program module causes said server device to accept payment from a user if there is no consignment discrepancy.

7. The system of claim 6, wherein said server device issues a clearance document after said user pays said customs duty and taxes for said consignment.

8. The system of claim 1, wherein said inspection process is not initiated, said application program module causes said server device to accept payment from said user.

9. The system of claim 2, wherein said server device issues a clearance document after said user pays said customs duty and taxes for said consignment.

10. The system of claim 1, wherein said risk analysis includes identifying, analyzing and evaluating a risk corresponding to the predetermined parameters and the risk criteria.

11. The system of claim 10, wherein said risk analysis further includes comparing said risk against target criteria.

12. The system of claim 10, wherein said risk analysis further includes comparing said received information with target criteria.

13. The system of claim 11, wherein a system administrator defines and updates said target criteria.

14. The system of claim 1, wherein said application program module causes said server device to retrieve price information from a reference price database in order to calculate said amount of customs duty and taxes for said consignment.

15. The system of claim 1, wherein said information pertaining to said consignment includes information obtained from a manifest document.

16. The system of claim 1, wherein said information pertaining to said consignment includes information obtained from a shipping invoice.

17. The system of claim 1, wherein said information pertaining to said consignment includes information obtained from a customs declaration.

18. The system of claim 1, wherein a customs department initiates an inspection process based on said results of said status.

19. The system of claim 1, wherein said inspection process is at least one of a random inspection, a sample inspection, and a full inspection.

20. A method for processing customs information at a customs organization utilizing a client-user device and a server device connected to a communication network, said server device having a communication server module for communicating over said network with a user of said server device for processing customs information at a customs organization for goods clearance, the method comprising the steps of:

generating and registering, at the client-user device, an electronic declaration document for a user pertaining to a consignment using a declaration module;

receiving, at the server device from the client-user device over the communication network, the electronic declaration document pertaining to a consignment at the customs organization prior to receipt of the consignment from the user at the customs organization, including identification of specific goods in said consignment and predetermined parameters of said consignment, said predetermined parameters comprising tariff, rule, or regulatory information pertaining to said consignment;

identifying the user corresponding to said electronic declaration document and the consignment;

verifying, at the server device using the declaration module, said electronic declaration document received at the customs organization prior to receipt of the consignment at the customs organization;

configuring a risk management module based on a transaction history and at least one factor pertaining to the user;

conducting, at the server device, a risk analysis using the risk management module, wherein the risk management module considers the electronic declaration document and accompanying electronic documentation using risk criteria for the risk analysis to determine a status for said declaration document, wherein the risk analysis includes defining the risk and target criteria, analyzing and assessing risk based on the risk and target criteria, prescribing risk target action according to the risk, and tracking and reporting the risk target action, wherein the status pertains to the identification of specific goods, the risk parameters and the predetermined parameters listed within said declaration document;

calculating, at the server device, an amount of customs duty and taxes for said consignment; and determining, at the server device, whether or not to initiate an inspection process at said customs organization based on results of said status for said declaration document when the consignment is received at the customs organization.

21. The method of claim 20, further comprising the step of re-calculating the amount of said customs duty and taxes if said inspection process is initiated and there is a consignment discrepancy.

22. The method of claim 21, further comprising the step of recording said consignment discrepancy.

23. The method of claim 20, further comprising the step of accepting payment from said user.

24. The method of claim 23, further comprising the step of issuing a clearance document after said user pays said customs duty and taxes for said consignment.

25. The method of claim 20, further comprising the step of accepting payment from said user if said inspection process is initiated and there is no consignment discrepancy.

26. The method of claim 25, further comprising the step of issuing a clearance document after said user pays said customs duty and taxes for said consignment.

27. The method of claim 20, further comprising the step of accepting payment from said user if said inspection process is not initiated.

28. The method of claim 27, further comprising the step of issuing a clearance document after said user pays said customs duty and taxes for said consignment.

29. The method of claim 20, wherein said risk analysis includes identifying, analyzing and evaluating a risk corresponding to the predetermined parameters and the risk criteria.

30. The method of claim 29, wherein said risk analysis further includes comparing said risk against target criteria.

31. The method of claim 30, wherein a system administrator defines and updates said target criteria.

32. The method of claim 20, further comprising the step of retrieving price information from a reference price database in order to assess a declared value of said goods.

33. The method of claim 20, wherein said information pertaining to said consignment includes information obtained from a manifest document.

34. The method of claim 20, wherein said information pertaining to said consignment includes information obtained from a shipping invoice.

35. The method of claim 20, wherein said information pertaining to said consignment includes information obtained from a customs declaration.

36. The method of claim 20, wherein a customs department initiates an inspection process based on said results of said status.

37. The method of claim 20, wherein said inspection process is at least one of a random inspection, a sample inspection, and a full inspection.

38. The system of claim 1, wherein said server device receives said declaration from a user of the server device.

39. The system of claim 38, wherein said server device comprises a user login, wherein said server device receives a user profile of said user, and wherein said system identifies said user and said user profile.

40. The system of claim 39, wherein said system displays errors in data entry by the user and prompts said user to provide said declaration in a recognized format.

41. The system of claim 1, wherein the application program module pays the amount of customs duty and taxes for said consignment.

42. The system of claim 1, wherein the application program module: randomly allocates an inspection request to an inspector based on workload and availability;

randomly allocates an assessment request to an assessment officer based on workload and availability;

sends required information to other governmental agencies; and validates approvals from other governmental agencies for release of shipment.

43. The system of claim 1, wherein said consignment is imported or exported through an Air, Sea or Land port.

44. The system of claim 1, wherein the application program module defines a new duty calculation formula and risk criteria.

45. The system of claim 38, wherein said user enters all information related to said consignment's manifest, bill of lading, delivery order, commercial invoice and declaration and the risk management module automatically runs said risk analysis based on said entered information.

46. The system of claim 1, wherein said application program module takes into consideration any exemptions, quota or bi-lateral agreements when calculating the applicable duty and taxes for said consignment.

47. The system of claim 1, wherein said application program module is initiated by an assessment officer, and wherein said application program module causes said server device to display a historical value of commodity for assessment and valuation.

48. The system of claim 1, wherein said application program module causes said server device to re-calculate the amount of said customs duty and taxes if there is a consignment value discrepancy.

49. The system of claim 47, wherein said application program module causes said server device to record a consignment value discrepancy and request documents from a user of said system.

50. The system of claim 10, wherein said risk analysis includes consideration of all transactions and stakeholders.

51. The system of claim 1, wherein said inspection process results in generating an inspection report to record a consignment discrepancy or risk finding.

52. The method of claim 20, further comprising receiving a user profile of said user at said server device, and wherein said system identifies said user and said user profile.

53. The method of claim 20, further comprising displaying errors in data entry by the user and prompting said user to provide said declaration in a recognized format.

54. The method of claim 20, further comprising paying the amount of customs duty and taxes for said consignment.

55. The method of claim 20, further comprising:

randomly allocating an inspection request to an assessment officer based on workload and availability;

randomly allocating an assessment request to an assessment officer based on workload and availability;

sending required information to other governmental agencies; and validating approvals from other governmental agencies for release of shipment.

56. The method of claim 20, wherein said consignment is imported or exported through an Air, Sea or Land port.

57. The method of claim 20, further comprising defining, at the server device, a new duty calculation formula and risk criteria.

58. The method of claim 20, further comprising transmitting information related to said consignment's manifest, bill of lading, delivery order, commercial invoice and declaration from said user to said server device and automatically running said risk analysis based on said transmitted information.

59. The method of claim 20, further comprising taking into consideration any exemptions, quota or bi-lateral agreements when calculating, at the server device, the applicable duty and taxes for said consignment.

60. The method of claim 20, wherein said steps are initiated by an assessment officer, and further comprising displaying a historical value of a commodity for assessment and valuation.

61. The method of claim 20, further comprising re-calculating the amount of said customs duty and taxes if there is a consignment value discrepancy.

62. The method of claim 60, further comprising recording a consignment value discrepancy and requesting documents from said user.

63. The method of claim 20, wherein said risk analysis includes consideration of all transactions and stakeholders.

64. The method of claim 20, wherein said inspection process results in generating an inspection report to record a consignment discrepancy or risk finding.

65. The method of claim 20, further comprising delivering a document to traders for requirements related to customs clearance.

66. The method of claim 20, further comprising providing online services for customs clearance processing to stakeholders in a plurality of different languages.

67. The method of claim 20, further comprising receiving information related to goods declaration for imports, exports, re-export, re-import, temporary import, temporary export, transit, transshipment, courier express bill, free zone bills, bonded warehouse bills, or postal packages.

68. The method of claim 20, further comprising executing data validation, authentication checks and risk analysis to ensure internal referential integrity, completeness of data, or compliance.

69. The method of claim 20, further comprising accepting duty payment from said user in a plurality of currencies.

70. The method of claim 20, further comprising defining a new duty calculation formula, exemption, bi-lateral agreement, or new risk criteria for use by the server device.

* * * * *

UNITED STATES PATENT AND TRADEMARK OFFICE
CERTIFICATE OF CORRECTION

PATENT NO. : 10,108,921 B2  
APPLICATION NO. : 12/240817  
DATED : October 23, 2018  
INVENTOR(S) : Sultan Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1388 days.

Signed and Sealed this  
Thirtieth Day of July, 2019

Andrei Iancu  
*Director of the United States Patent and Trademark Office*